(12) United States Patent
Cord et al.

(10) Patent No.: US 12,386,361 B2
(45) Date of Patent: Aug. 12, 2025

(54) METHOD FOR MANAGING A FLEET OF AUTONOMOUS PARKING ROBOTS BY A SUPERVISOR

(71) Applicant: Stanley Robotics, Versailles (FR)

(72) Inventors: Aurélien Cord, Paris (FR); Clément Boussard, Paris (FR); Thibaut Pierret, Buc (FR)

(73) Assignee: Stanley Robotics, Versailles (FR)

( * ) Notice: Subject to any disclaimer, the term of this patent is extended or adjusted under 35 U.S.C. 154(b) by 376 days.

(21) Appl. No.: 17/597,644

(22) PCT Filed: Jul. 10, 2020

(86) PCT No.: PCT/FR2020/051249
§ 371 (c)(1),
(2) Date: Feb. 17, 2022

(87) PCT Pub. No.: WO2021/009453
PCT Pub. Date: Jan. 21, 2021

(65) Prior Publication Data
US 2022/0326718 A1    Oct. 13, 2022

(30) Foreign Application Priority Data
Jul. 15, 2019   (FR) ........................... 1907969

(51) Int. Cl.
*E04H 6/34* (2006.01)
*G05D 1/00* (2006.01)

(52) U.S. Cl.
CPC ......... *G05D 1/0297* (2013.01); *G05D 1/0274* (2013.01)

(58) Field of Classification Search
CPC ...... G05D 1/0297; G05D 1/0274; E04H 6/36; E04H 6/34; E04H 6/422; E04H 6/424; E04H 6/24; B60P 3/07
See application file for complete search history.

(56) References Cited

U.S. PATENT DOCUMENTS

| | | | |
|---|---|---|---|
| 2014/0365258 A1* | 12/2014 | Vestal | G16H 40/20 901/1 |
| 2017/0200367 A1* | 7/2017 | Mielenz | G05D 1/0285 |

(Continued)

FOREIGN PATENT DOCUMENTS

| | | | |
|---|---|---|---|
| CN | 109403690 A  * | 3/2019 | E04H 6/18 |
| FR | 3073769 B1 | 5/2021 | |

(Continued)

OTHER PUBLICATIONS

Translation of CN109403690A (Year: 2018).*

(Continued)

*Primary Examiner* — Kenneth J Malkowski
(74) *Attorney, Agent, or Firm* — TraskBritt

(57) ABSTRACT

The invention relates to a method for managing a fleet of autonomous parking robots by a supervisor. Each autonomous robot comprises a computer and a memory for storing a digital map of the parking space and geolocation means, environment sensors and means for telecommunication with the supervisor. The supervisor comprises a computer and a memory for storing a digital map of the parking space, as well as means for telecommunication with the robots, a record of a unique identifier of each of the robots, and a computer for computing the trajectories of the autonomous robots.

7 Claims, 1 Drawing Sheet

(56) References Cited

U.S. PATENT DOCUMENTS

2017/0313307 A1   11/2017   Nordbruch
2018/0004202 A1    1/2018   Onaga et al.
2018/0005338 A1    1/2018   Kazama et al.

FOREIGN PATENT DOCUMENTS

JP    2006-231421 A    9/2006
JP    2018-015132 A    2/2018
WO    2018/021457 A1   1/2018

OTHER PUBLICATIONS

Durrant-Whyte et al., Field and service applications—An autonomous straddle carrier for movement of shipping containers—From Research to Operational Autonomous Systems. IEEE Robotics & Automation Magazine 14 (2007), pp. 14-23.
International Search Report for International Application No. PCT/FR2020/051249 dated Oct. 15, 2020, 3 pages.
International Written Opinion for International Application No. PCT/FR2020/051249 dated Oct. 15, 2020, 7 pages.
Japanese Notice of Reasons for Refusal for Application No. 2022-502233 dated Jan. 26, 2024, 23 pages.

\* cited by examiner

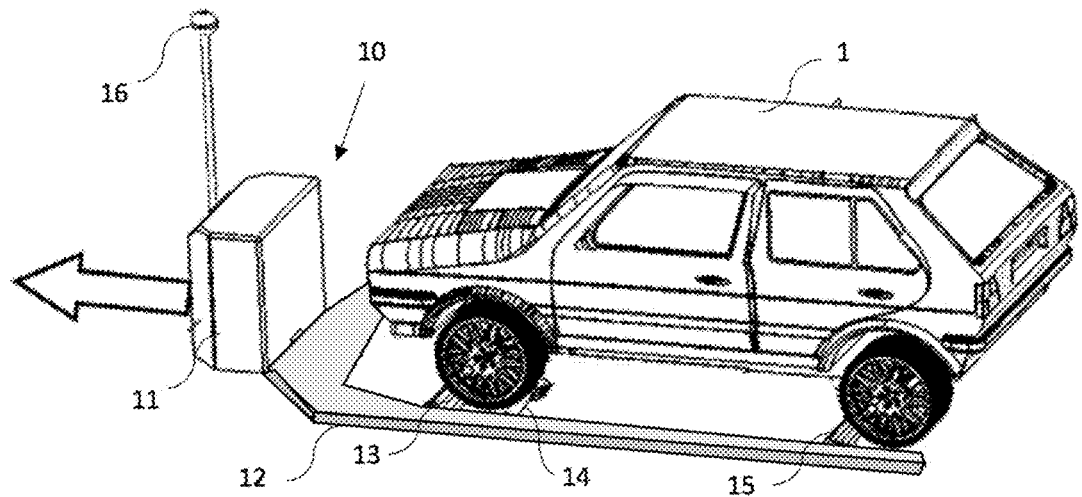
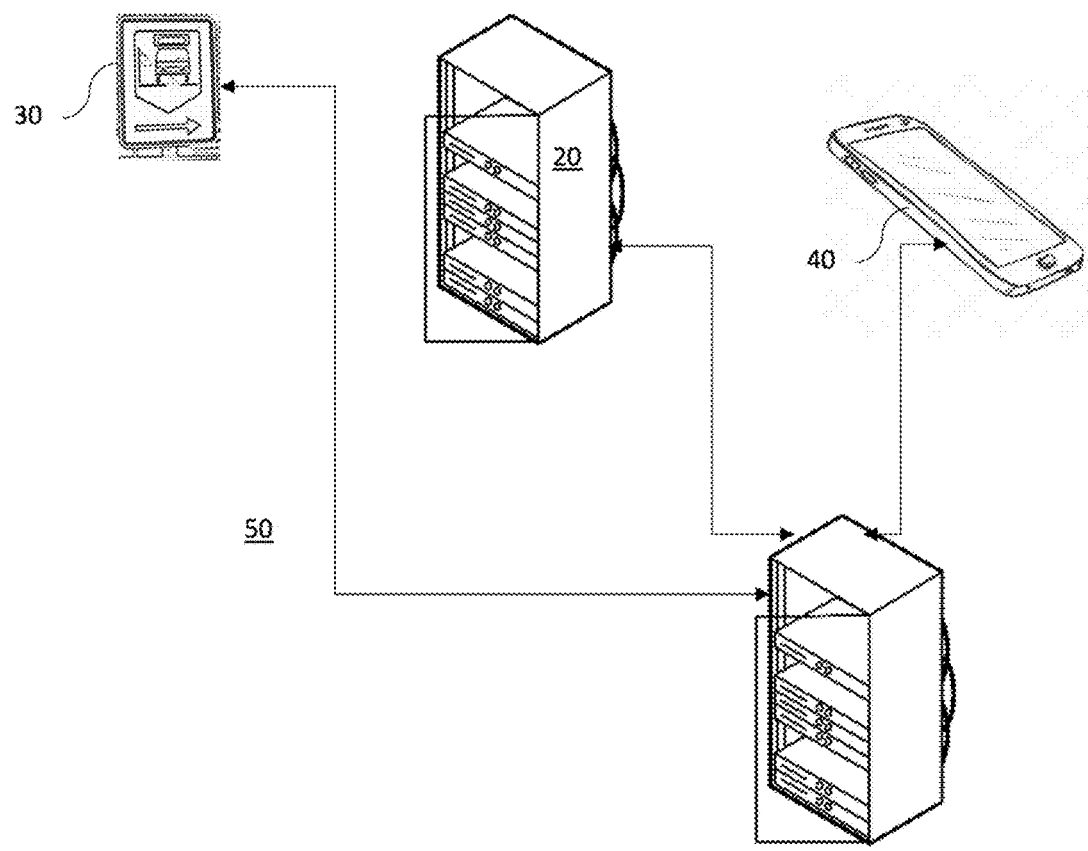

METHOD FOR MANAGING A FLEET OF AUTONOMOUS PARKING ROBOTS BY A SUPERVISOR

CROSS-REFERENCE TO RELATED APPLICATIONS

This application is a national phase entry under 35 U.S.C. § 371 of International Patent Application PCT/FR2020/051249, filed Jul. 10, 2020, designating the United States of America and published as International Patent Publication WO 2021/009453 A1 on Jan. 21, 2021, which claims the benefit under Article 8 of the Patent Cooperation Treaty to French Patent Application Serial No. FR1907969, filed Jul. 15, 2019.

TECHNICAL FIELD

The present disclosure relates to the field of automatic parking lot systems with a high storage intensity making it possible to optimize the use of zones of various shapes.

BACKGROUND

A traditional conventional parking lot wastes a tremendous amount of space. The parking space is often much larger than what is strictly necessary for the vehicles. This makes it easier for drivers to maneuver and allows the doors to be opened once the car is parked. In addition, a conventional parking lot is deeper and the ceilings are higher to allow drivers and pedestrians to move around.

This is why driverless parking solutions and automatic parking lot systems are being developed. Automatic parking lot systems limit the loss of space specific to conventional parking lot facilities. An automatic mechanical system takes charge of the vehicle and transports it to its parking space, then on return, when the driver comes to collect a car, an automatic car movement system returns it to the driver. Thus, the spaces provided for parking are much smaller and the traffic lanes can be optimized. In addition, no pedestrian moves inside the automatic parking lot, which makes it possible to reinforce the usage safety of autonomous equipment for moving vehicles between the reception area and the parking area. The driver deposits and retrieves a vehicle in an open and lit airlock at the entrance to the parking lot: the driver, therefore, does not have to walk through deserted aisles that are often unwelcoming to find a car.

Fully automated parking facilities are already known in which robots lift the vehicles to the starting position, then transport them and drop them off at a destination location. These transport robots can thus lift a vehicle and transport it automatically between the pick-up area and the drop-off area. As a variant, there are transport robots with a transportable frame constituting the drop-off area on which the vehicle is placed so that the transport robot can transport the vehicle on the frame to the drop-off area.

To allow the operational use of this type of automatic parking, the autonomous equipment must be able to address the problem of obstacle detection from an obstacle map and sensors fitted to each of the autonomous equipment items.

The vehicle location function is provided by technical solutions that collaborate for continuous operating robustness: odometric location, location by matching occupancy grids and location by matching between a current image and an image database suitable for a specific need.

The navigation problem of the autonomous vehicle involves controlling the actuators to follow a given trajectory, possibly maintaining on an admissible trajectory to avoid unmapped obstacles.

The drop-off and pick-up trajectories of a vehicle are often based on three spirals and possibly two arcs of circle (if the maximum deflection is reached) to create trajectories with continuous curvature.

These solutions are suitable for the individual management of each parking robot, ensuring scheduled trips. More recently, it has also been proposed to deploy fleets of robots working in a cooperative manner.

Chinese patent CN109403690A is known, for example, describing an automatic vehicle transfer system comprising the following steps:
- establishing an interactive relationship with a user; and
- obtaining the user's parking request, and sending a loading and transport device for loading and transporting a user's vehicle to the user's parking position.

The loading and transport device automatically loads and transports the user's vehicle to be parked in a designated parking position; the user's pick-up request is obtained, and the loading and transport device for loading and transporting the user's vehicle is sent to the designated parking position. The device automatically loads and transports the user's vehicle to be parked at a designated pickup position. The automatic vehicle transport and transfer system comprises the loading and transport device, a multi-loading and transport device task scheduling system, a vehicle-mounted automatic navigation hardware platform and a software system, a system transfer station and a man-machine interaction subsystem, in which the loading and transport device is a parking robot.

Another prior art patent, US2018004202, describes a robot dispatch request system that provides a user interface through which a user can send a service request to use at least one "robot as a service" (RaaS). Robotic fleets can be made up of a set of homogeneous robots or a set of heterogeneous robots. A service request may not specify a particular robotic fleet to perform the requested service. The robot dispatch request system can determine an optimal robotic fleet (or an optimal combination of multiple robotic fleets) to perform the requested service, and then request that a fleet management system select one or more robots from the determined robotic fleet to perform the requested service.

Patent FR3073769 relates to a parking robot comprising a transport platform of adjustable height for transporting a motor vehicle, a movement installation for moving the height of the transport platform relative to the traffic surface, and a control installation for controlling the movement installation so as to move the transport platform relative to the traffic surface after the vehicle has been loaded on the transport platform, from its loading position, in which the vehicle is loaded on the transport platform, to a transport position, in which the vehicle is transported, the transport position being above the loading position so that the height of the transport platform is higher than the loading position relative to the traffic surface.

Another solution is described in patent US2014365258 a job management system comprising a map defining a floor plan, a set of virtual job locations and a set of one or more virtual job operations associated with virtual job locations. The system automatically determines the actual locations and actual job operations for the job requests, and intelligently selects a suitable mobile robot to handle each job request based on the current status and/or the current configuration for the selected mobile robot. The system also sends commands to the selected mobile robot to cause the mobile robot to automatically drive the actual job location, to automatically perform the actual job operations, or both.

The article by Durrant-Whyte, Hugh F., Daniel Pagac, Ben Rogers, Michael Stevens and Graeme Nelmes, "Field and service applications—An autonomous straddle carrier for movement of shipping containers—From Research to Operational Autonomous Systems." IEEE Robotics & Automation Magazine 14 (2007): 14-23 describes the development and implementation of an autonomous straddle cart (AutoStrad) for moving shipping containers in a port environment. In this article, the vehicle and the control, navigation, safety and piloting functions are described, which allow autonomous operation. The description of the implementation of the complete system also addresses issues of operational safety, planning and operations planning, interfaces with dockside cranes and road transport vehicles.

In the solutions of the prior art, each robot receives the movement instructions between the vehicle's loading point and drop-off point and calculates its trajectory either locally and completely autonomously, as a function of the geolocation data and of the environmental data acquired by sensors, or by way of processing carried out by a computer of a server communicating with the robot.

This solution is satisfactory for a limited flow of cars, with a simple organization of the parking lot. It allows the arriving or departing cars to be moved sequentially, possibly with several robots working in parallel.

However, these solutions do not make it possible to respond to large flows of cars, through strategies for optimizing the movements of robots, working collaboratively.

BRIEF SUMMARY

The object of the present disclosure is to remedy these drawbacks by proposing a method for managing a fleet of autonomous parking robots by a supervisor, wherein:

Each autonomous robot comprises a computer and a memory for storing a digital map of the parking space and geolocation means, environment sensors and means for telecommunication with the supervisor; and The supervisor comprises a computer and a memory for storing a digital map of the parking space, as well as means for telecommunication with the robots, a record of a unique identifier of each of the robots, and a computer for computing the trajectories of the autonomous robots.

The method comprises the following steps:

Intermittent steps of computing, by the supervisor, a plurality of actions each including a digital message comprising an action identifier, a designation of one or more tasks and a designation of at least one starting or ending point, associated with an identifier of one of the autonomous robots;

Intermittent steps of computing, for each of the actions, at least one task including digital messages comprising a designation of an operation, associated with an identifier of one of the autonomous robots;

Episodic acquisition by the supervisor of digital messages transmitted by the robots, containing the unique robot identifier, the time-stamped geolocation data of the robot and, if applicable, the execution status of a task;

Episodic acquisition by the supervisor of digital messages from peripheral equipment;

Periodic recomputing of a series of tasks or actions;

Periodic transmission of digital action messages; and

Computation by each of the robots of the commands for these actuators based on the active task message, local geolocation information and the status of its environment sensors.

The robots are thus treated not as completely independent elements, but as a fleet working more efficiently.

Advantageously, the actions further comprise a priority indicator and in that the method comprises episodic steps of recomputing the scheduling of actions and tasks based on the priority indicators.

Preferably, the digital map of the parking space is divided into surface elements, each comprising a semaphore whose status SEM(x, y) can be "free," "reserved for robot i," "occupied by robot i," "inaccessible."

where x,y denote the barycenter of the surface element.

The "free" status corresponds to an element accessible by any robot. The "reserved for robot i" status authorizes access only to robot i and prohibits access and reservation for other robots. The "occupied by robot i" status means that all or part of the dynamic footprint of robot i encroaches on all or part of the surface element. The dynamic footprint is understood to be the physical footprint of the robot increased by a distance margin and projected in the direction of movement of robot i as a function of its speed. The "busy" status prohibits access and reservation to all other robots. The "inaccessible" status prohibits access and/or reservation to all robots.

The supervisor takes care of updating the statuses of all the semaphores according to the time-stamped geolocation data of each robot. For example, it can assign the "reserved for robot i" status to all the semaphores SEM(x, y) corresponding to the trajectory of robot i for the execution of its task.

BRIEF DESCRIPTION OF THE DRAWINGS

The present disclosure will be better understood on reading the detailed description of a non-limiting example of the present disclosure that follows, with reference to the accompanying drawings, where:

FIG. 1 shows a schematic view of a system according to the present disclosure.

DETAILED DESCRIPTION

The present disclosure relates to the management of a fleet of robots whose actions are coordinated by a supervisor. The present disclosure relates more particularly to a dissociation between:

Computing the strategies for moving and optimizing the actions of the robot fleet, which is carried out by the supervisor only;

Execution of a mission transmitted by the supervisor by the robot to which the mission has been allocated, and which is transmitted by the supervisor in the form of a brief digital message comprising an action identifier, a designation of one or more tasks and a designation of at least one starting or ending point, associated with an identifier of one of the autonomous robots; and Episodic transmission by each robot of information allowing the supervisor to reassess the missions.

General Description of the System

The system comprises a series of valet robots (10) capable of positioning themselves to grip the wheels of a car (1) using a system of arms (13, 14, 15) that are articulated with respect to a longitudinal beam (12).

An example of such a robot is described in patent application EP3297876A1. However, the solution described in this document differs from the present disclosure by the fact that in this patent, the articulated arms extend from a frame sliding under the car, toward the outside, whereas in the example described in relation to FIG. 1, two longitudinal beams (12) extend on either side of the vehicle and have articulated arms (13 to 15) extending inward. This solution makes it easier to move a vehicle with very low ground clearance.

Each valet robot (10) has a motorized unit (11) associated with environment sensors (16), for example, a Lidar or a multidirectional camera, as well as sensors such as odometric sensors, ultrasonic sensors for detecting obstacles, geolocation means, etc.

The valet robot (10) also comprises a computer for controlling the various actuators (movement of the arms (13 to 15)), lifting of the side members (12), and motors for the movement of the unit (11) according to the environmental data from the sensors, and instructions from a supervisor (20) communicating with the robot fleet by electronic messages.

Each valet robot (10) is associated with a unique digital identifier to allow identification by the computer processing carried out by the supervisor (20) and the addressing of messages by the supervisor to the valet robot (10) concerned by an action.

General Operating Principle

Each valet robot (10) comprises the computer resources to control sequences of actions according to the instructions received, for example:
  Receive a vehicle (1): control the movements of the unit (11) of the robot (10) to position the side members (12) along the vehicle, control the movements of the arms (13 to 15); and
  Movement along a theoretical trajectory: control the motors of the unit (11) based on the trajectory on the one hand and the information from the sensors, to control a movement taking into account the obstacles and local situations.

The supervisor (20) continuously computes the tasks that must be carried out by each of the valet robots (10) available on the parking space, optimizing the actions of the fleet of robots, according to the instructions from a service manager (50) collecting digital information from peripheral equipment, such as:
  A receiving terminal (30) located in the vehicle reception area;
  A smartphone (40), for example, sending a message from an owner to retrieve a vehicle; and
  Messages from a dedicated supervision interface.

The service manager (50) calculates the trips to be made for the vehicles stored or to be stored and transmits them to the supervisor (20) in the form of actions for the valet robots (10). The supervisor converts these actions into tasks and transmits them to the valet robots (10) so as to optimize the availability of the valet robots (10) to load the vehicle(s) arriving in the reception area, the loading of vehicles to be moved to the recovery area, and also the movement of vehicles in the parking area, in order to reorganize the position of the cars to densify storage and to reposition the vehicles so that they are easier to access as the return date approaches. This information is transmitted to the supervisor (20), which distributes the tasks to the valet robots (10) and verifies their acknowledgment, and if necessary dialogues with the service manager (50) to report any unavailability and order the computation of new series of actions.

The supervisor (20) and the service manager (50) can be combined in a single computer equipment item. Alternatively, a service manager (50) can be common to several supervisors (20) each controlling a dedicated parking space.

Communication Protocol

The communication protocol makes it possible to distribute vehicle movement orders over several robots, as well as to manage a fleet of robots. This protocol is based on a communication service (API) to add or consult task statuses, to ensure communication with all the robots present in the parking lot, and to communicate with the rest of the service, in particular, the system manager (50) of the parking lot.

The supervisor (20) manages the fleet of valet robots (10) and computes digital orders of two types:
  Action: An Action represents a high-level instruction intended for a robot. It has a unique identification number (UUID) allowing exchanges between the different actors. Ex. "Move the car from place A to place B," "Go to place C"; and
  Task: a task represents an elementary robot instruction. An action can generally be broken down into several tasks.

Some Examples of Tasks:
  Load: task commanding the robot to load a vehicle. The attributes of this task are, for example, the coordinates of the vehicle to be loaded;
  Loaded move: task commanding the robot to move with a vehicle loaded on its platform. The attributes of this task are, for example, the coordinates of the starting point (implicitly the current position of the robot) and the coordinates of the end of the movement trajectory, or the succession of movement segments;
  Unloading: task commanding the robot to unload a vehicle and then move it. The attributes of this task are, for example, the coordinates of the unloading point (implicitly the current coordinates of the robot) and the coordinates of the end of the movement trajectory, or the succession of movement segments;
  Unloaded move: task commanding the robot to move without a vehicle. The attributes of this task are, for example, the coordinates of the starting point (implicitly the current position of the robot) and the coordinates of the end of the movement trajectory, or the succession of movement segments; and
  Go to the battery recharging location: task commanding the robot to move toward the battery recharging area. The attributes of this task are, for example, the coordinates of the starting point (implicitly the current coordinates of the robot) and the coordinates of the end of the movement trajectory (location of the recharging point), or the succession of movement segments.

The system manager (50) has a call grammar available to discuss actions with the supervisor (20) comprising:
[POST]
  send the action
[GET]
  /actions: list of all available Actions
  /actions/current: returns the Actions in progress
  /actions/{UUID}: returns an Action by UUID identifier
[PUT]
  /actions/[UUID]/Cancel: cancels the Action (if it has not started)
  modify the priority of the Action Valet Robot (10) Fleet Manager and Task Statuses The supervisor (20) will split the actions transmitted by the system manager (50) into tasks intended for the robots.

The supervisor (20) will manage the availability of the robots based on the information transmitted by the system manager (50).

If no robot (10) is available, the tasks are retained by the supervisor (20) until a robot (10) is available to receive a task. Beyond a determined period, the supervisor (20) transmits the information to the system manager (50), which recomputes new options.

A valet robot (10) is configured to process only one job at a time. However, it can receive a list of tasks to be performed successively.

The statuses of a task for the valet robot are:
to be executed;
running;
executed; and
aborted.

The supervisor (20) retrieves the status of the current task from each valet robot (10) in the fleet, evaluates the status of the corresponding action and transmits it to the system manager (50).

The statuses of an action for the system manager (50) and/or the supervisor (20) that it can communicate to the rest of the service are:
Waiting for an available robot;
Allocated to a valet robot designated by its identifier (which will replace the "to be executed" status);
Human intervention requested;
Aborted; and
Canceled.

The supervisor (20) evaluates the status of the action based on the statuses of the corresponding tasks.

Priority Management of Actions

The system manager (50) sets a priority for each action between 0 and 1000 (1000 being the highest priority).

As long as an action has not started, the system manager (50) retains the possibility of modifying the priority (in general to increase it).

The supervisor (20) ensures that the tasks with the highest priority are performed first.

Chained Actions

Some actions (parent) must be performed before another (daughter), for example, if one car must be moved so that another is accessible.

The parent should be executed before the daughter. The supervisor (20) must manage the order of execution of the actions to guarantee this constraint. Chained actions can be performed by one or more robots.

In this context, the supervisor (20) can send several robots simultaneously to distribute the tasks between them so that the action is performed correctly.

Integration with the Geographic Database

The service manager (50) constructs each action by retrieving the identifiers of the places storing each vehicle from an external service. When receiving an action, the supervisor (20) retrieves the coordinates of the places with the same service from the identifier.

Multi-Robot Functionalities

In order to manage several valet robots (10) moving simultaneously in the storage area, it has been divided into separate surface elements, each comprising a semaphore whose status SEM(x, y) can be "free," "reserved for robot i," "occupied by robot i" or "inaccessible."

The "free" status corresponds to an element accessible by any robot. The "reserved for robot i" status authorizes access only to robot i and prohibits access and reservation for other robots. The "occupied by robot i" status means that all or part of the dynamic footprint of robot i encroaches on all or part of the surface element. The dynamic footprint is understood to be the physical footprint of the robot increased by a distance margin and projected in the direction of movement of robot i as a function of its speed. The "busy" status prohibits access and reservation to all other robots. The "inaccessible" status prohibits access and/or reservation to all robots.

The supervisor takes care of updating the statuses of all the semaphores according to the time-stamped geolocation data of each robot. Thus, for each robot, the supervisor (20) reserves the space necessary to carry out its task or its maneuvers.

When moving a robot, the supervisor (20) checks that each surface element to be occupied soon by the robot is "free" or "reserved for robot i" and modifies its status, if necessary, so that the robot performs its action.

If a task passes through an unauthorized surface element:
either the supervisor (20) is able to bypass the surface element to propose another path for carrying out the task;
or the task will be put on hold by the supervisor (20) until the current task is completed or the surface elements are released;
or the robot advances to the entrance of the unauthorized surface element and waits for the latter to be released.

The deletion/cancellation of an action on the supervisor (20) results in the release of the concerned surface elements.

Once the robot has passed a surface element, it is returned to the free state so that another robot can access this element.

If a task is aborted by a robot, the supervisor (20) will look for another robot available to perform this task and finalize the associated action.

The invention claimed is:

1. A method for managing a fleet of autonomous parking robots comprising a plurality of autonomous robots, controlled by a supervisor and a service manager, wherein:
   each autonomous robot comprises a computer and a memory for storing a digital map of a parking space and a geolocation device, environment sensors and a device for telecommunication with the supervisor;
   the supervisor comprises a computer and a memory for storing a digital map of the parking space, as well as a device for telecommunication with the robots, a record of a unique identifier of each of the robots, and a computer for computing the trajectories of the autonomous robots; and
   the service manager calculates the trips to be made for the vehicles that are stored in a parking area or that are to be stored in the parking area and transmits the calculated trips to the supervisor in the form of actions for the robots,
   wherein the supervisor is configured to:
      convert each of the actions into one or more tasks, each of the one or more tasks configured to, when performed by the robots, perform at least part of an associated action of the actions transmitted by the service manager such that an action is completed responsive to execution of each of the one or more tasks associated with the action, and
      transmit the one or more tasks associated with each action of the actions to the robots, wherein the one or more tasks associated with each action of the actions are configured to:
         facilitate the availability of the robots to load the vehicle(s) arriving in the reception area,
         load vehicles to be moved to an area designated for pickup of the vehicles, or update or determine the movement of vehicles in the parking area to reorganize the position of the vehicles to densify storage and reposition the vehicles so that they are easier to access as the return date approaches;

receive and verify an acknowledgement from each of the robots, the acknowledgement indicative that the tasks were successfully received, and dialogue with the service manager to report any unavailability of one or more robots to execute an action provided by the service manager and request computation of a new series of actions responsive to the unavailability, wherein the method comprises the following steps:

intermittent steps of computing, by the supervisor, a plurality of actions each including a digital message comprising an action identifier, a designation of one or more tasks and a designation of at least one starting or ending point, associated with an identifier of one of the autonomous robots;

intermittent steps of computing, for each of the actions, at least one task including digital messages comprising a designation of an operation, associated with an identifier of one of the autonomous robots;

episodic acquisition by the supervisor of digital messages transmitted by the robots, containing the unique robot identifier and time-stamped geolocation data of the robot;

episodic acquisition by the supervisor of digital messages from peripheral equipment;

periodic recomputing of a series of tasks or actions;

periodic transmission of digital action messages; and computation by each of the robots of commands for actuators based on the active task message, local geolocation information and status of its environment sensors.

2. The method of claim 1, wherein the actions further comprise a priority indicator, and wherein the method further comprises episodic steps of recomputing the scheduling of actions and tasks based on the priority indicators.

3. The method of claim 1, wherein the digital map of the parking space is divided into surface elements, each comprising a semaphore whose status SEM(x, y)i determines the accessibility by the robot ROBi, and wherein the supervisor assigns, to all the semaphores SEM(x, y) corresponding to the trajectory of the robot ROBi for the execution of a task, an active status for the robot ROBi and a non-active status for all other robots.

4. The method of claim 1, wherein the digital map of the parking space is divided into surface elements, each comprising a semaphore whose status SEM(x, y)i determines the accessibility by the robot ROBi and in that the supervisor assigns, to the semaphores SEM(x, y) corresponding to the current, future and/or past positions over a given duration of the robot ROBi for the execution of a task or a maneuver, an active status for the robot ROBi and a non-active status for all other robots.

5. The method of claim 1, wherein the supervisor automatically decides to assign the robot ROBi most suitable for the execution of the task to a task, taking into account one or more criteria.

6. The method of claim 5, wherein the one or more criteria include one or more of a distance to be covered, a state of charge of the robots, a rate of use of each robot or a priority of the task.

7. The method of claim 1, wherein the messages transmitted by the robots contains a status of execution of the task.

* * * * *